United States Patent
Tseng

(10) Patent No.: US 8,159,965 B2
(45) Date of Patent: Apr. 17, 2012

(54) METHOD OF COMPARING STATE VARIABLE OR PACKET SEQUENCE NUMBER FOR A WIRELESS COMMUNICATIONS SYSTEM AND RELATED APPARATUS

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 973 days.

(21) Appl. No.: 12/121,797

(22) Filed: May 16, 2008

(65) Prior Publication Data

US 2008/0285493 A1    Nov. 20, 2008

Related U.S. Application Data

(60) Provisional application No. 60/938,707, filed on May 18, 2007.

(51) Int. Cl.
*H04W 4/00* (2009.01)

(52) U.S. Cl. ............ 370/252; 370/310.2; 370/328; 370/394

(58) Field of Classification Search .................. None
See application file for complete search history.

(56) References Cited

U.S. PATENT DOCUMENTS

| | | | |
|---|---|---|---|
| 5,151,899 A * | 9/1992 | Thomas et al. | 370/394 |
| 7,266,197 B1 * | 9/2007 | Guillou et al. | 380/44 |
| 2003/0223385 A1 | 12/2003 | Jiang | 370/324 |
| 2005/0270996 A1 * | 12/2005 | Yi et al. | 370/312 |
| 2006/0221833 A1 | 10/2006 | Jiang | 370/235 |
| 2006/0251038 A1 * | 11/2006 | Tamura et al. | 370/342 |

FOREIGN PATENT DOCUMENTS

| KR | 1020040040710 A | 5/2004 |
|---|---|---|
| WO | 2005117317 A1 | 12/2005 |

OTHER PUBLICATIONS

3GPP TS 25.322 V6.9.0 (Sep. 2006), "Radio Link Control (RLC) protocol specification (Release 6)".

* cited by examiner

*Primary Examiner* — Chi H. Pham
*Assistant Examiner* — Shick Hom
(74) *Attorney, Agent, or Firm* — Klein, O'Neill & SIngh, LLP

(57) ABSTRACT

A method of comparing a state variable or a sequence number, hereinafter called SN, of a packet with modulus arithmetic for a receiving terminal of a wireless communications system includes determining an SN range of a receiving window and using a minimum SN of the receiving window as a modulus base for a duplicate avoidance and reordering, hereinafter called DAR, entity and a reception buffer when a DAR function is configured; determining an SN range of a storage window and using a minimum SN of the storage window as the modulus base when an out of sequence packet delivery function is configured; and using an SN of the latest packet received by the reception buffer plus a first predetermined value as the modulus base when neither the out of sequence packet delivery function nor the DAR function is configured.

38 Claims, 6 Drawing Sheets

METHOD OF COMPARING STATE VARIABLE OR PACKET SEQUENCE NUMBER FOR A WIRELESS COMMUNICATIONS SYSTEM AND RELATED APPARATUS

CROSS REFERENCE TO RELATED APPLICATIONS

This application claims the benefit of U.S. Provisional Application No. 60/938,707, filed on May 18, 2007 and entitled "Method And Apparatus for Using Modulus Base in Different Entities", the contents of which are incorporated herein by reference.

BACKGROUND OF THE INVENTION

1. Field of the Invention

The present invention relates to a method of comparing a state variable or a packet sequence number for a wireless communications system and related communications device, and more particularly to a method of comparing a state variable or a packet sequence number with modulus arithmetic in an unacknowledged mode of a wireless communications system and related communications device.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

The 3rd Generation Partnership Project (3GPP) sets forth a Radio Link Control (RLC) communications protocol standard for providing different levels of transmission quality with operating modes of Transparent Mode (TM), Unacknowledged Mode (UM), and Acknowledged Mode (AM). TM is appropriate for use in services with high requirements for real-time transmission, UM is appropriate for use in services with requirements for real-time transmission and packet sequencing, and AM is appropriate for use in services with low requirements for real-time transmission, but high requirements for data accuracy.

In UM, an RLC entity of the receiver, generally including reception buffer, remove RLC header, and reassembly entities, receives protocol data unit (PDUs) from a lower layer, namely the physical layer, and then discards or stores the PDUs in the reception buffer according to sequence numbers (SNs) of the PDUs. For realization of the aforementioned RLC operations, the foregoing specification defines a VR(US) state variable containing an SN following the SN of the latest PDU received by the reception buffer. For example, when a PDU with an SN equal to (x) is received by the reception buffer, VR(US) is set equal to (x+1). VR(US) is updated each time the reception buffer receives a PDU. The receiver discards associated service data units (SDUs) included in the PDU if the SN of the PDU is out of sequence.

The 3G mobile communications system also provides Multimedia Broadcast and Multicast Service (MBMS), which transmits service content (e.g., television programs, movies, commercials) from servers to each user equipment (UE) through different cells in Unacknowledged Mode (UM). Each UE may be located under coverage of many different cells. In other words, a UE can receive a same service content from different cells.

In order to have a user equipment (UE) correctly process the service content and take advantage of this multi-route transmission characteristic, the RLC entity of a UMTS receiver as well as the UE are able to initiate a Duplicate Avoidance and Reordering (DAR) function, efficiently combining the PDUs that may be transmitted from different sources (cells) and/or duplicating transmission from a same source to form a single order of a PDU sequence. In this situation, the RLC entity consists of a DAR entity, a reception buffer, a RLC header remove entity and a reassembly entity. After the DAR function is initiated, the RLC entity executes duplicate PDU detecting, discarding and reordering operations according to the SNs of the PDUs. For more detailed description of the operations, please refer to following statements.

To support the Duplicate Avoidance and Reordering Function, state variables and protocol parameters below are defined by the specification of the communications protocol described above:

1. VR(UDR): A state variable representing an SN of a next PDU that is expected to be received in sequence.

2. VR(UDH): A state variable representing an SN of a highest numbered PDU that has been received by the Duplicate Avoidance and Reordering Function.

3. DAR_Window_Size: A parameter indicating a size of a receiving window of the Duplicate Avoidance and Reordering Function.

The RLC entity executes the Duplicate Avoidance and Reordering Function according to V (UDR) and a receiving window of the Duplicate Avoidance and Reordering Function where a receivable range of the receiving window is from (VR(UDH)−DAR_Window_Size+1) to VR(UDH). After initiating the Duplicate Avoidance and Reordering Function, the receiver determines whether a SN of a received PDU lies inside or outside the receiving window and whether the reception buffer stores a PDU having the same SN as that of the received PDU, so as to determine whether the received PDU is duplicated or not. If the SN of the received PDU lies outside the receiving window, the received PDU is stored in the reception buffer, and VR(UDH) is set to be the SN of the received PDU.

For the MBMS of the UMTS in the 3 G communications system, the 3GPP further provides an "out of sequence Service Data Unit (SDU) delivery" function, so that a receiver operating in an Unacknowledged Mode (UM) can more efficiently process the PDUs that are periodically retransmitted by a transmitter. Operating in the Unacknowledged Mode means that even if packets (PDUs) transmitted comprise sequence numbers (SNs), the receiver does not report a receiving status back to the transmitter when it receives or drops a packet. Therefore, in UM, the transmitter cannot positively acknowledge whether packets it has transmitted are successfully received.

To increase a probability that the receiver successfully receives packets, the transmitter can periodically retransmit packets that it has already transmitted, and the MBMS in UM uses the same periodic retransmission mechanism. When the RLC entity of the receiver in UM initiates the out of sequence SDU delivery function, the RLC entity recombines and delivers the SDUs to an upper protocol layer as fast as it can. In other words, even if a PDU with an earlier (lower) SN has not yet been successfully received, as long as a PDU comprising a complete SDU has been successfully received, the RLC entity delivers the complete SDU to the upper layer. In addition, when the out of sequence SDU delivery function is initiated, in order to allow the retransmitted SDUs to be reconstructed effectively by the receiver, the reception buffer of the receiver stores a PDU until all SDUs of the stored PDU have been reconstructed, after which the PDU is deleted from the reception buffer. Other than that, to maintain good receiving efficiency, the prior art deletes PDUs from the reception buffer in accordance with a storage window and a timer.

For the out of sequence SDU delivery function, the specification mentioned above also defines the following state variables and parameters:

1. VR(UOH): A state variable representing a highest of all SNs of all PDUs that have been received;
2. OSD_Window_Size: A parameter representing a size of a storage window; and
3. Timer_OSD: A timer representing a time spent waiting to receive a next PDU. When a PDU is received, the timer is reset. If the timer expires and another PDU has not yet been received, the receiver deletes all PDUs stored in the reception buffer.

According to the specification described above, after the receiver establishes or re-establishes the receiving entity when receiving a first PDU, VR(UOH) is initialized and set to SN−1 based on a SN of the first PDU. If the SN of the PDU received by the receiver is outside of the storage window, meaning that the SN of the PDU is not in a union {x|VR(UOH)>=x>VR(UOH)−OSD_Window_Size}, the state variable VR(UOH) is set to be the SN of the PDU, i.e. VR(UOH)=SN. Additionally, if the timer Timer_OSD expires, the PDUs stored in the reception buffer are deleted.

In the specification, the receiver has to compare the aforementioned state variables or SNs with modulus arithmetic for determining whether the received PDU lies inside or outside the receiving or storage window. Furthermore, the receiver of the prior art uses the VR(US) state variable as a modulus base for all modulus arithmetic in UM. In this situation, when the DAR function or the out of sequence SDU delivery function is in use, using VR(US) inapplicable to the functions as the modulus base causes errors in state variable or SN comparison.

SUMMARY OF THE INVENTION

The present invention therefore provides a method of comparing a state variable or a sequence number corresponding to a packet with modulus arithmetic for a receiving terminal in UM in a wireless communications system and related communications device that can configure correct modulus bases for different functions to ensure a correct comparing result of the state variable or the sequence number.

The present invention discloses a method of comparing a state variable or a sequence number corresponding to a packet with modulus arithmetic for a receiving terminal of a wireless communications system. The receiving terminal operates in an unacknowledged mode and supports a DAR function. The method includes establishing a DAR entity when the DAR function is initiated, providing a reception buffer for storing packets received by the receiving terminal, determining a sequence number range of a receiving window and using a minimum sequence number of the receiving window as a modulus base for the modulus arithmetic when the DAR function is configured, and then providing the modulus base for the DAR entity and the reception buffer to use when the DAR function is configured.

The present invention further discloses a communications device in of a wireless communications system for accurately comparing a state variable or a sequence number corresponding to a packet with modulus arithmetic to avoid comparison errors. The communications device operates in an unacknowledged mode and supports a DAR function, and includes a control circuit, a processor, a reception buffer and a memory. The control circuit is used for realizing functions of the communications device. The processor is installed in the control circuit and used for executing a program code to command the control circuit. The memory is installed in the control circuit and coupled to the processor, and used for storing the program code. The reception buffer is installed in the memory and used for storing packets received by the communications device. The program code includes establishing a DAR entity when the DAR function is initiated, determining a sequence number range of a receiving window and using a minimum sequence number of the receiving window as a modulus base for the modulus arithmetic when the DAR function is configured, and then providing the modulus base for the DAR entity and the reception buffer to use.

The present invention further discloses a method of comparing a state variable or a sequence number corresponding to a packet with modulus arithmetic for a receiving terminal of a wireless communications system. The receiving terminal operates in an unacknowledged mode and supports an out of sequence packet delivery function. The method includes determining a sequence number range of a storage window and using a minimum sequence number of the storage window as a modulus base for the modulus arithmetic when the out of sequence packet delivery function is configured.

The present invention further discloses a communications device in of a wireless communications system for accurately comparing a state variable or a sequence number corresponding to a packet with modulus arithmetic to avoid comparison errors. The communications device operates in an unacknowledged mode and supports an out of sequence packet delivery function, and includes a control circuit, a processor, a reception buffer and a memory. The control circuit is used for realizing functions of the communications device. The processor is installed in the control circuit and used for executing a program code to command the control circuit. The memory is installed in the control circuit and coupled to the processor, and used for storing the program code. The reception buffer is installed in the memory and used for storing packets received by the communications device. The program code includes determining a sequence number range of a storage window and using a minimum sequence number of the storage window as a modulus base for the modulus arithmetic when the out of sequence packet delivery function is configured.

The present invention further discloses a method of comparing a state variable or a sequence number corresponding to a packet with modulus arithmetic for a receiving terminal of a wireless communications system. The receiving terminal operates in an unacknowledged mode and supports an out of sequence packet delivery function and a DAR function. The method includes providing a reception buffer for storing packets received by the receiving terminal, and then using a sequence number of the latest packet received by the reception buffer plus a predetermined value as a modulus base for the modulus arithmetic when neither the out of sequence packet delivery function nor the DAR function is configured.

The present invention further discloses a communications device in of a wireless communications system for accurately comparing a state variable or a sequence number corresponding to a packet with modulus arithmetic to avoid comparison errors. The communications device operates in an unacknowledged mode and supports an out of sequence packet delivery function and a DAR function, and includes a control circuit, a processor, a reception buffer and a memory. The control circuit is used for realizing functions of the communications device. The processor is installed in the control circuit and used for executing a program code to command the control circuit. The memory is installed in the control circuit and coupled to the processor, and used for storing the program code. The reception buffer is installed in the memory and used for storing packets received by the communications device. The program code includes using a sequence number of the latest packet received by the reception buffer plus a predetermined value as a modulus base for the modulus arithmetic when neither the out of sequence packet delivery function nor the DAR function is configured.

The present invention further discloses a method of comparing a state variable or a sequence number corresponding to a packet with modulus arithmetic for a receiving terminal of a wireless communications system. The receiving terminal operates in an unacknowledged mode and supports an out of sequence packet delivery function and a DAR function. The method includes establishing a DAR entity when the DAR function is initiated, providing a reception buffer for storing packets received by the receiving terminal, determining a sequence number range of a receiving window and using a minimum sequence number of the receiving window as a modulus base for the modulus arithmetic when the DAR function is configured, providing the modulus base for the DAR entity and the reception buffer to use when the DAR function is configured, determining a sequence number range of a storage window and using a minimum sequence number of the storage window as the modulus base when the out of sequence packet delivery function is configured, and then using a sequence number of the latest packet received by the reception buffer plus a first predetermined value as the modulus base when neither the out of sequence packet delivery function nor the DAR function is configured.

The present invention further discloses a communications device in of a wireless communications system for accurately comparing a state variable or a sequence number corresponding to a packet with modulus arithmetic to avoid comparison errors. The communications device operates in an unacknowledged mode and supports an out of sequence packet delivery function and a DAR function, and includes a control circuit, a processor, a reception buffer and a memory. The control circuit is used for realizing functions of the communications device. The processor is installed in the control circuit and used for executing a program code to command the control circuit. The memory is installed in the control circuit and coupled to the processor, and used for storing the program code. The reception buffer is installed in the memory and used for storing packets received by the communications device. The program code includes establishing a DAR entity when the DAR function is initiated, determining a sequence number range of a receiving window and using a minimum sequence number of the receiving window as a modulus base for the modulus arithmetic when the DAR function is configured, providing the modulus base for the DAR entity and the reception buffer to use when the DAR function is configured, determining a sequence number range of a storage window and using a minimum sequence number of the storage window as the modulus base when the out of sequence packet delivery function is configured, and then using a sequence number of the latest packet received by the reception buffer plus a first predetermined value as the modulus base when neither the out of sequence packet delivery function nor the DAR function is configured.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
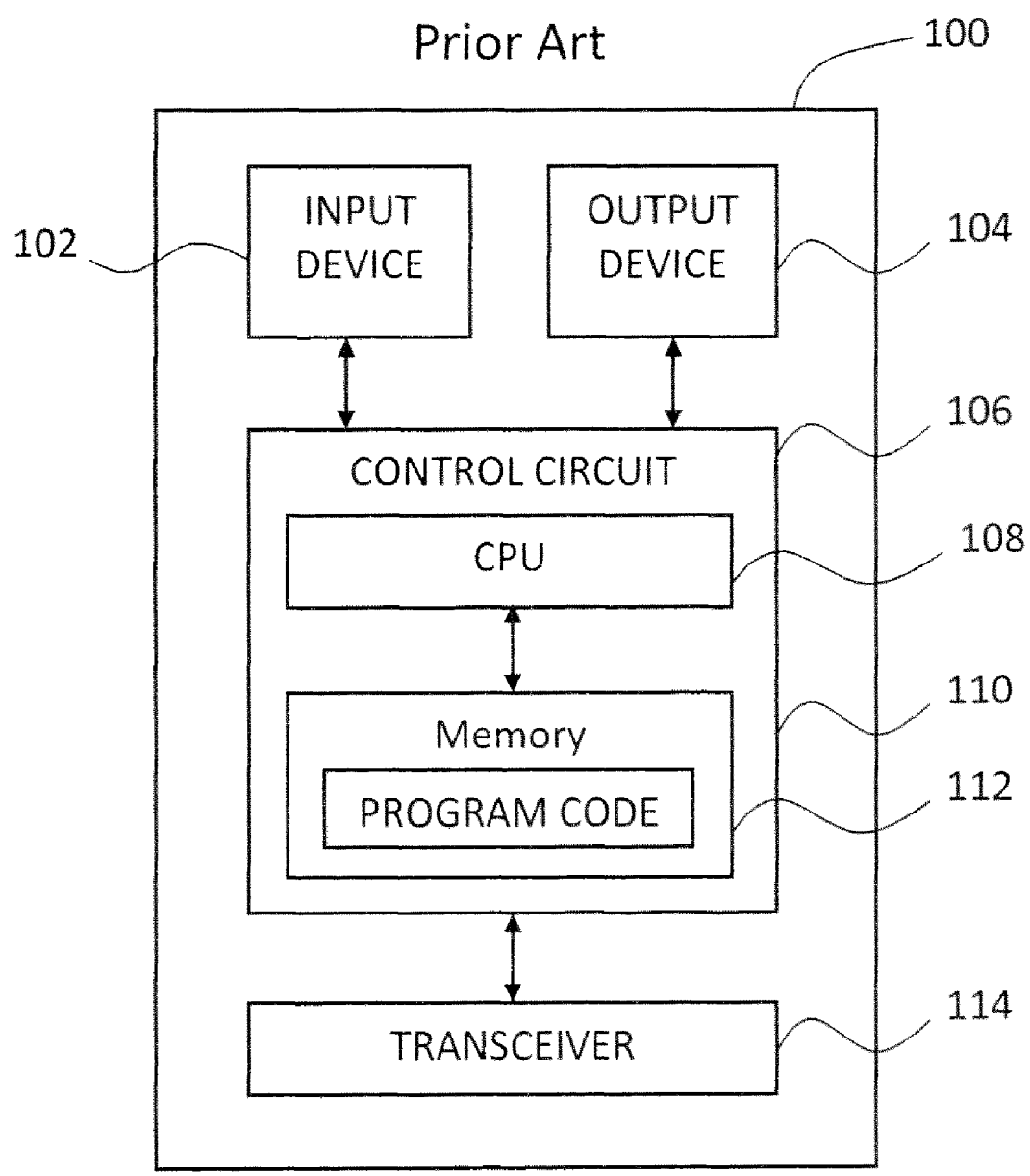
FIG. 1 is a functional block diagram of a communications device.

Please refer to FIG. 1, which is a functional block diagram of a communications device 100 used in the third generation telecommunications system. For the sake of brevity, FIG. 2 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. The communications device 100 supports a duplicate avoidance and reordering (DAR) function and an out of sequence packet delivery function including an out of sequence Service Data Unit (SDU) delivery function.

Figure 2:
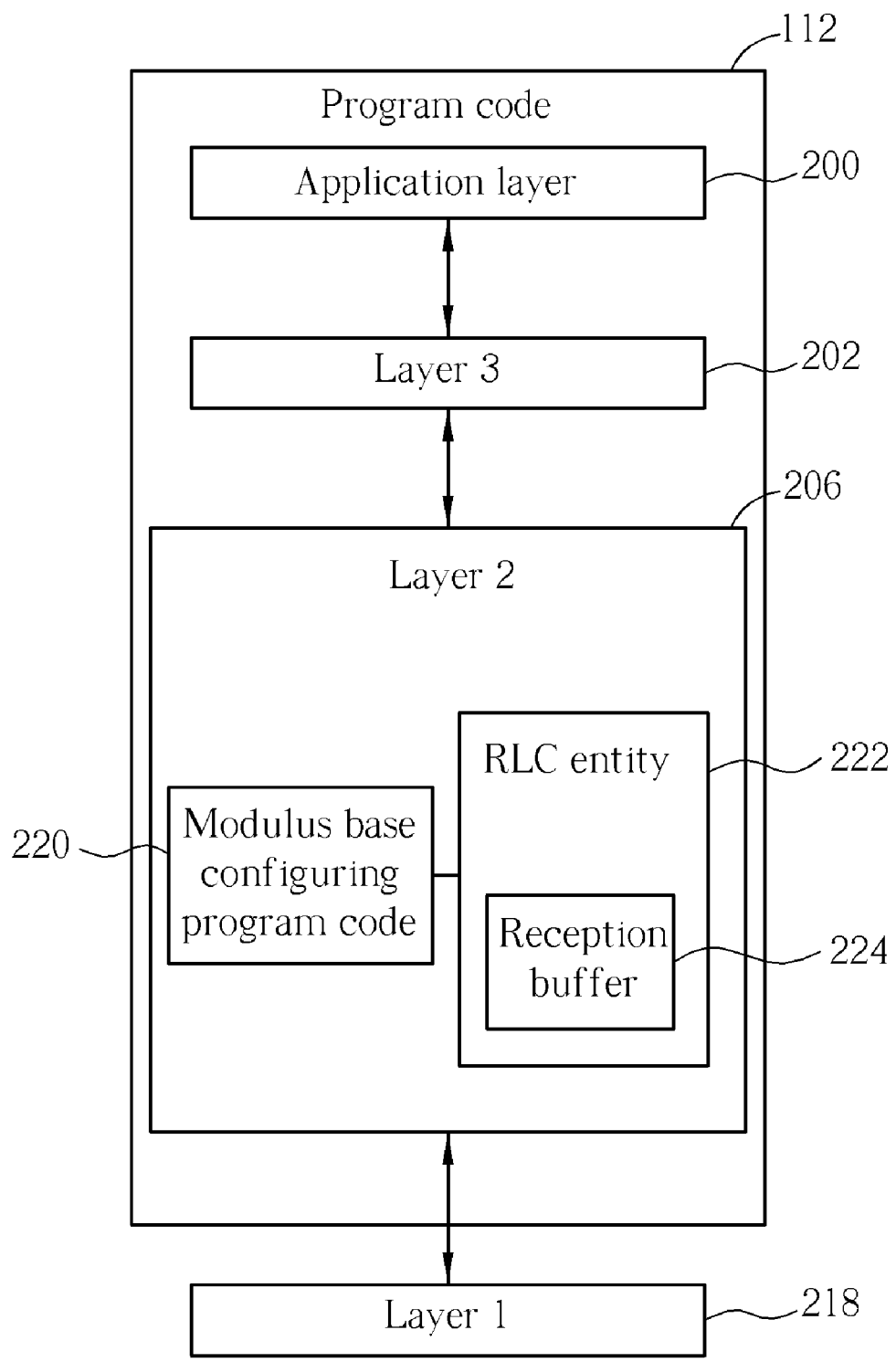
FIG. 2 is a diagram of the program code shown in FIG. 2.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1 218. The Layer 2 206 includes a radio link control (RLC) entity 222 for performing the DAR function and the out of sequence SDU delivery function. The RLC entity 222 employs a reception buffer 224 and establishes a DAR entity when the DAR function is initiated. In addition, the RLC entity 222 is allowed to use state variables VR(UDR) and VR(UDH), and a parameter DAR_Window_Size for the DAR function. As for the out of sequence SDU delivery function, a state variable VR(UOH), a parameter OSD_Window_Size and a timer Timer_OSD can be used. Those aforementioned variables and parameters are described and defined in detail in the foregoing paragraphs.

Figure 3:
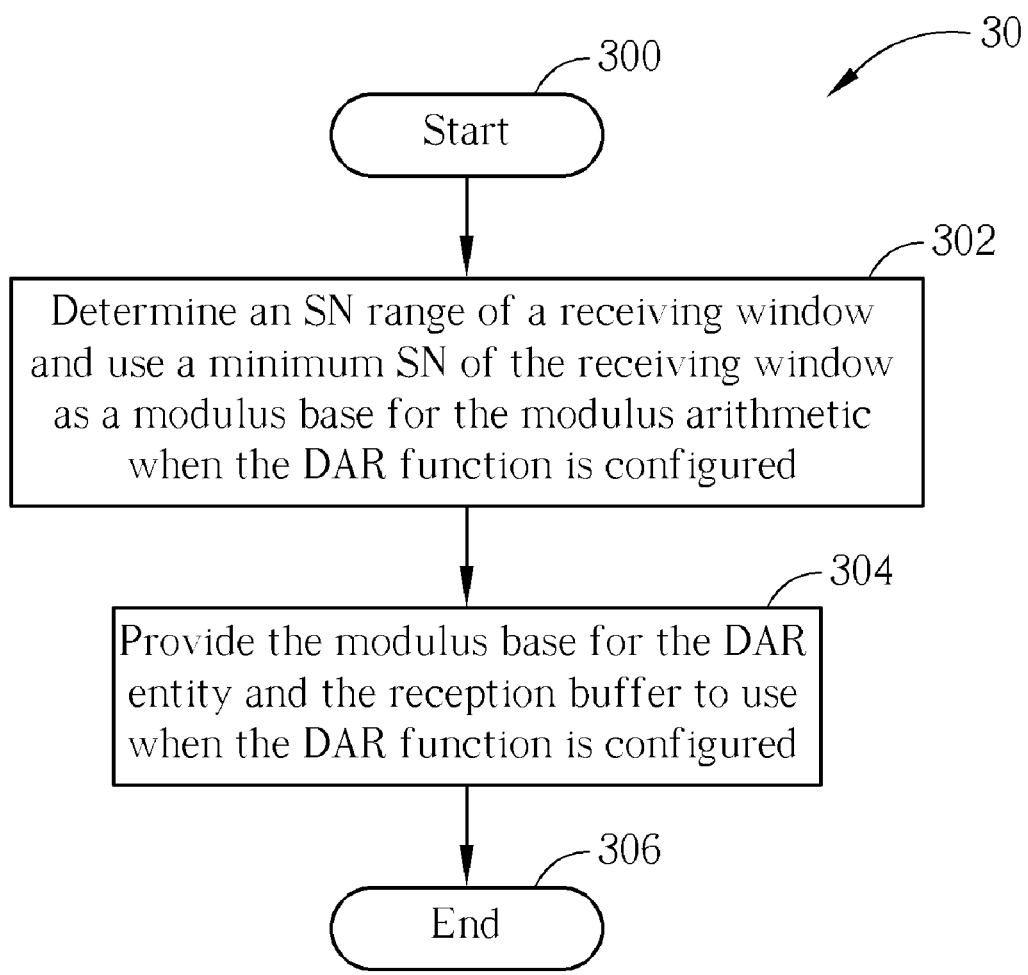
FIG. 3 is a flowchart diagram of a process according to an embodiment of the present invention.

When the RLC entity 222 operates in the UM (Unacknowledged Mode), the embodiment of the present invention provides a modulus base configuring program code 220 in the program code 112 for avoid a wrong determining result for duplicated or out-of-sequence packets. Please refer to FIG. 3, which illustrates a schematic diagram of a process 30 according to an embodiment of the present invention. The process 30 is utilized to compare a state variable or a sequence number (SN) corresponding to a packet with modulus arithmetic for a receiving terminal of the wireless communications system, and can be compiled into the modulus base configuring program code 220. The process 30 includes the following steps:

Step 300: Start.

Step 302: Determine an SN range of a receiving window and use a minimum SN of the receiving window as a modulus base for the modulus arithmetic when the DAR function is configured.

Step 304: Provide the modulus base for the DAR entity and the reception buffer to use when the DAR function is configured.

Step 306: End.

The process 30 is applied to the DAR function. According to the process 30, when the DAR function is configured, the receiving terminal determines the SN range of the receiving window and uses the minimum SN as the modulus base. Further, the receiver provides the modulus base for both the DAR entity and the reception buffer (ex. the reception buffer 224) to use.

Preferably, under the DAR function, the receiving terminal configures VR(UDR), VR(UDH) and DAR_Window_Size, and thereby the SN range of the receiving window is determined to be from (VR(UDH)−DAR_Window_Size+1) to VR(UDH). The DAR entity and the reception buffer then both use (VR(UDH)−DAR_Window_Size+1) as the modulus base for the modulus arithmetic configured to determine whether the SN of the received packet (ex. PDU) lies inside or outside the receiving window.

Therefore, according to the process 30, the DAR entity and the reception buffer use the same modulus base to avoid a wrong determining result for duplicated packets.

Figure 4:
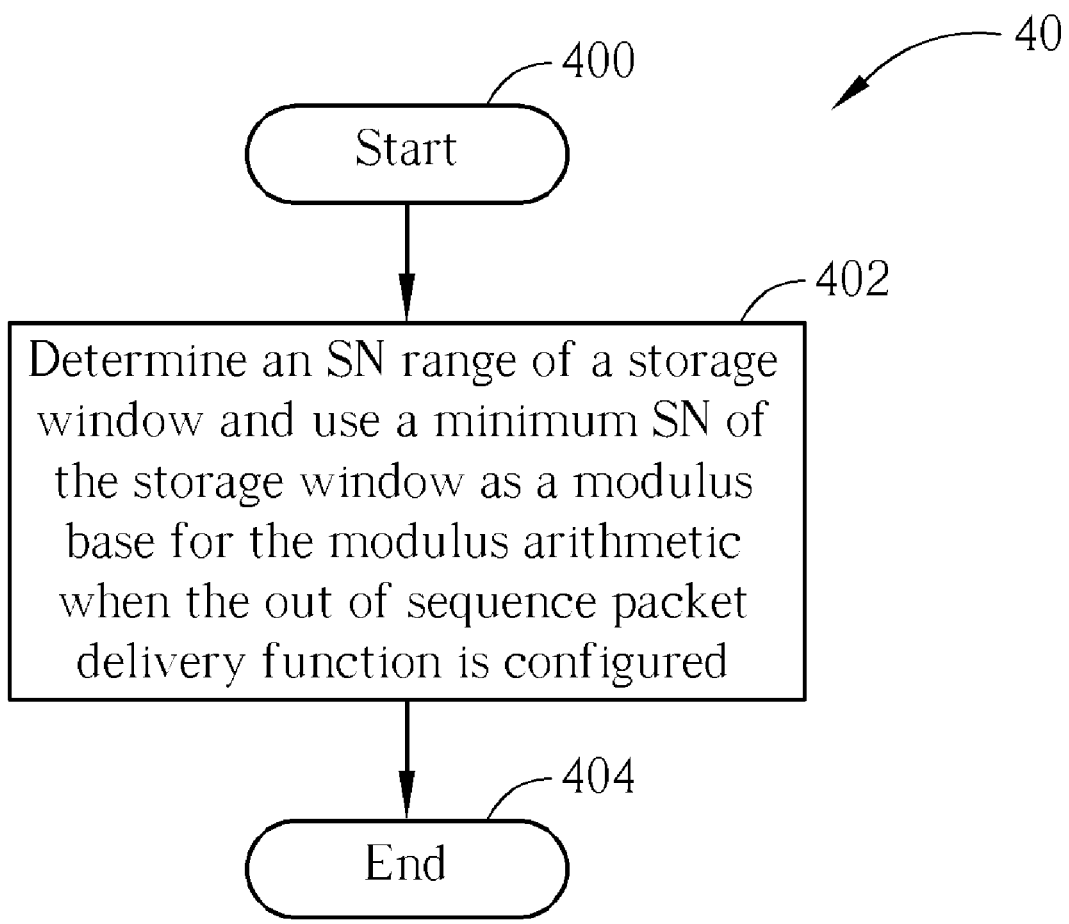
FIG. 4 is a flowchart diagram of a process according to an embodiment of the present invention.

Please refer to FIG. 4, which illustrates a schematic diagram of a process 40 according to an embodiment of the present invention. The process 40 is utilized to compare a state variable or an SN corresponding to a packet with modulus arithmetic for a receiving terminal of the wireless communications system, and can be compiled into the modulus base configuring program code 220. The process 40 includes the following steps:

Step 400: Start.

Step 402: Determine an SN range of a storage window and use a minimum SN of the storage window as a modulus base for the modulus arithmetic when the out of sequence packet delivery function is configured.

Step 404: End.

The process 40 is applied to the out of sequence packet delivery function. According to the process 40, when the out of sequence packet delivery function is configured, the receiving terminal determines the SN range of the storage window and uses the minimum SN as the modulus base.

Preferably, under the out of sequence packet delivery function, the receiving terminal configures VR(UOH) and OSD_Window_Size, and thereby the SN range of the storage window is determined to be from (VR(UOH)−OSD_Window_Size+1) to VR(UOH). The receiving terminal then uses (VR(UOH)−OSD_Window_Size+1) as the modulus base for the modulus arithmetic configured to determine whether the SN of the received packet (ex. PDU) lies inside or outside the storage window. Therefore, according to the process 40, the receiver can avoid a wrong determining result for out of sequence packets.

Figure 5:
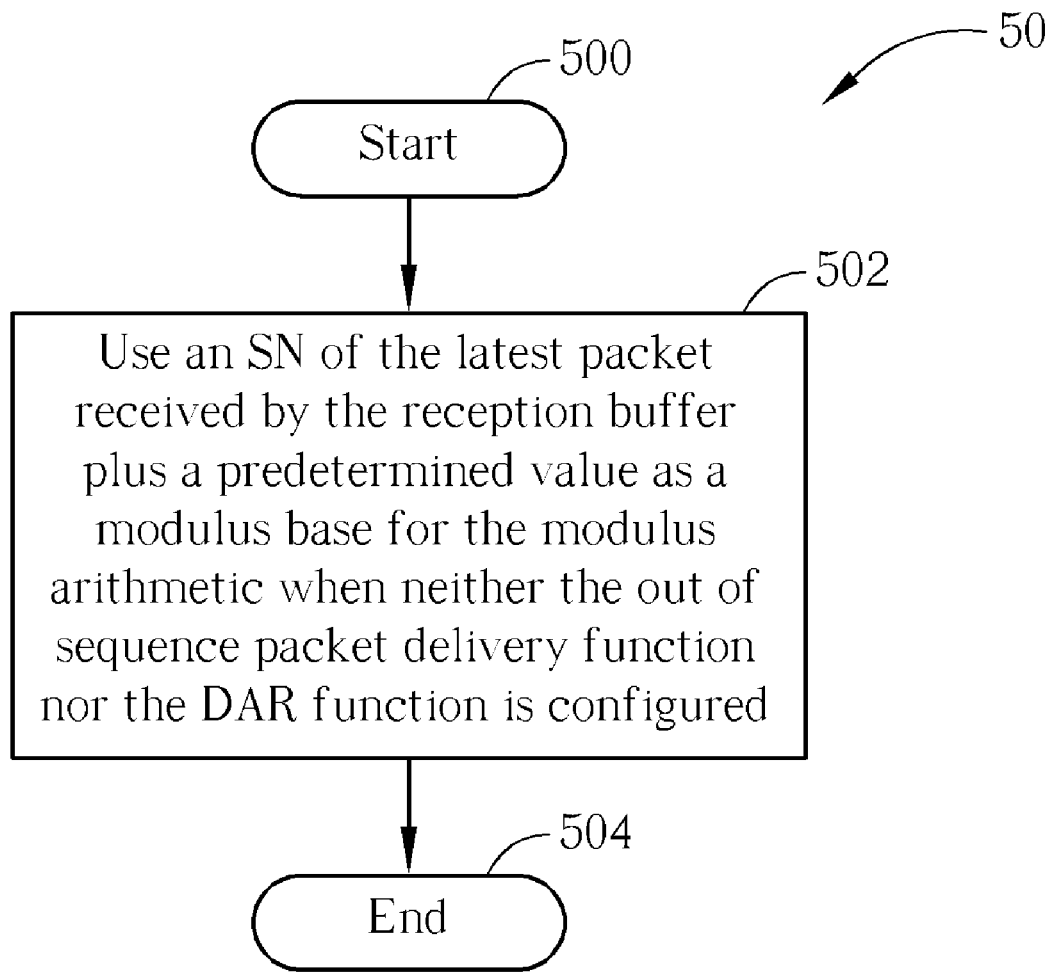
FIG. 5 is a flowchart diagram of a process according to an embodiment of the present invention.

Please refer to FIG. 5, which illustrates a schematic diagram of a process 50 according to an embodiment of the present invention. The process 50 is utilized to compare a state variable or an SN corresponding to a packet with modulus arithmetic for a receiving terminal of the wireless communications system, and can be compiled into the modulus base configuring program code 220. The process 50 includes the following steps:

Step 500: Start.

Step 502: Use an SN of the latest packet received by the reception buffer plus a predetermined value as a modulus base for the modulus arithmetic when neither the out of sequence packet delivery function nor the DAR function is configured.

Step 504: End.

The process 50 is applied to the situation where neither the out of sequence packet delivery function nor the DAR function is configured. In this situation, the receiving terminal uses the SN of the latest packet received by the reception buffer plus a predetermined value as the modulus base. The predetermined value is preferably 1.

Preferably, the receiving terminal configures the state variable VR(US) as the modulus base, where VR(US) is equal to the SN of the latest packet received by the reception buffer 224 plus 1.

Figure 6:
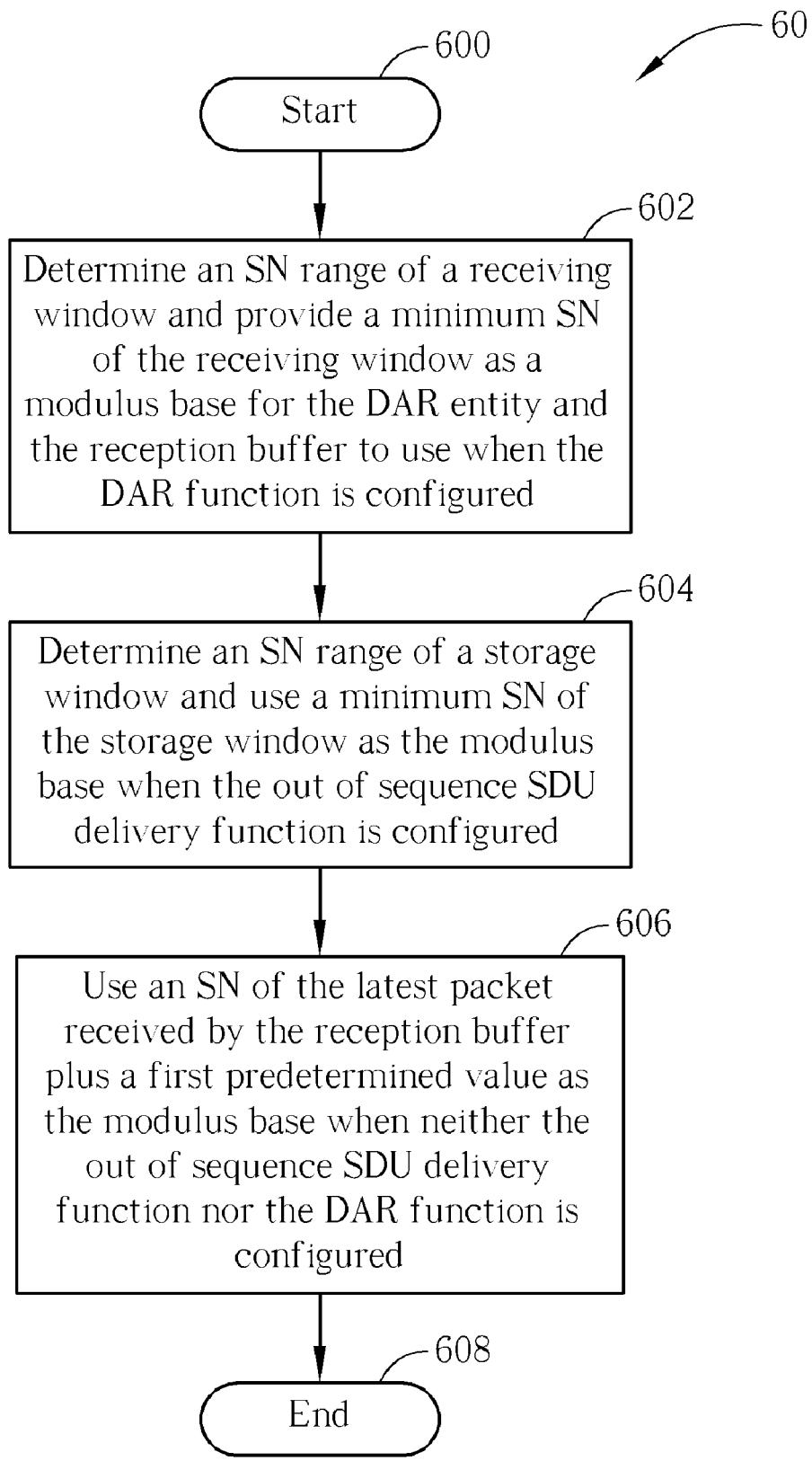
FIG. 6 is a flowchart diagram of a process according to an embodiment of the present invention.

The embodiment of the present invention can integrate the processes 30-50 to provide a comprehensive process for the different use modes of the DAR and out of sequence SDU delivery functions. Please refer to FIG. 6, which illustrates a schematic diagram of a process 60 according to an embodiment of the present invention. The process 60 is utilized to compare a state variable or an SN corresponding to a packet with modulus arithmetic for a receiving terminal of the wireless communications system, and can be compiled into the modulus base configuring program code 220. The process 60 includes the following steps:

Step 600: Start.

Step 602: Determine an SN range of a receiving window and provide a minimum SN of the receiving window as a modulus base for the DAR entity and the reception buffer to use when the DAR function is configured.

Step 604: Determine an SN range of a storage window and use a minimum SN of the storage window as the modulus base when the out of sequence SDU delivery function is configured.

Step 606: Use an SN of the latest packet received by the reception buffer plus a first predetermined value as the modulus base when neither the out of sequence SDU delivery function nor the DAR function is configured.

Step 608: End.

In the process 60, the receiving terminal sets VR(US) to the SN of the latest packet received by the reception buffer 224 plus 1 when neither the out of sequence SDU delivery function nor the DAR function is configured. When the DAR function is configured, the receiving terminal configures VR(UDR), VR(UDH) and DAR_Window_Size, and thereby the SN range of the receiving window is determined to be from (VR(UDH)−DAR_Window_Size+1) to VR(UDH). When the out of sequence SDU delivery function is configured, the receiving terminal configures VR(UOH) and OSD_Window_Size, and thereby the SN range of the storage window is determined to be from (VR(UOH)−OSD_Window_Size+1) to VR(UOH).

According to the process 60, the DAR entity and the reception buffer 224 both use (VR(UDH)−DAR_Window_Size+1) as the modulus base when the DAR function is configured, so as to determine whether the SN of the received PDU lies inside or outside the receiving window. When the out of sequence SDU delivery function is configured, the receiving terminal uses (VR(UOH)−OSD_Window_Size+1) as the modulus base for the modulus arithmetic configured to determine whether the SN of the received PDU lies inside or outside the storage window. When neither the out of sequence SDU delivery function nor the DAR function is configured, the receiving terminal uses VR(US) as the modulus base.

In conclusion, only the state variable VR(US) is used as the modulus base in UM, irrespective of whether the DAR or the out of sequence SDU delivery function is configured, according to the prior art. In this situation, errors in the state variable or SN comparison can occur when DAR or the out of sequence SDU delivery function is configured. Comparatively, the embodiments of the present invention configure suitable modulus base according to different use modes of the functions to ensure a correct determining result for duplicated or out-of-sequence packets. Thus, delivering the wrong determined packets to the upper layer can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of comparing a state variable or a sequence number corresponding to a packet with modulus arithmetic for a receiving terminal of a wireless communications system, the receiving terminal operating in an unacknowledged mode and supporting a duplicate avoidance and reordering function, hereinafter called DAR function, the method comprising:
   establishing a DAR entity when the DAR function is initiated;
   providing a reception buffer for storing packets received by the receiving terminal;
   the receiving terminal determining a sequence number range of a receiving window and using a minimum sequence number of the receiving window as a modulus base for the modulus arithmetic when the DAR function is configured; and
   the receiving terminal providing the modulus base for the DAR entity and the reception buffer to use when the DAR function is configured;
   wherein determining the sequence number range of the receiving window comprises determining the sequence number range of the receiving window according to a window size of the receiving window and a state variable corresponding to a maximum sequence number of the sequence numbers that have been received by the DAR entity.

2. The method of claim 1, wherein the minimum sequence number of the receiving window is derived from the state variable subtracting the window size of the receiving window plus a predetermined value.

3. The method of claim 2, wherein the predetermined value is 1.

4. A communications device of a wireless communications system for accurately comparing a state variable or a sequence number corresponding to a packet with modulus arithmetic to avoid comparison errors, the communications device operating in an unacknowledged mode and supporting a duplicate avoidance and reordering function, hereinafter called DAR function, the communications device comprising:
   a control circuit for realizing functions of the communications device;
   a central processing unit coupled to the control circuit for executing a program code to operate the control circuit;
   a memory coupled to the central processing unit for storing the program code; and
   a reception buffer installed in the memory, for storing packets received by the communications device;
   wherein the program code comprises:
      establishing a DAR entity when the DAR function is initiated;
      determining a sequence number range of a receiving window and using a minimum sequence number of the receiving window as a modulus base for the modulus arithmetic when the DAR function is configured; and
      providing the modulus base for the DAR entity and the reception buffer to use;
      wherein determining the sequence number range of the receiving window comprises determining the sequence number range of the receiving window according to a window size of the receiving window and a state variable corresponding to a maximum sequence number of the sequence numbers that have been received by the DAR entity.

5. The communications device of claim 4, wherein the minimum sequence number of the receiving window is derived from the state variable subtracting the window size of the receiving window plus a predetermined value.

6. The communications device of claim 5, wherein the predetermined value is 1.

7. A method of comparing a state variable or a sequence number corresponding to a packet with modulus arithmetic for a receiving terminal of a wireless communications system, the receiving terminal operating in an unacknowledged mode and supporting an out of sequence packet delivery function, the method comprising:
   the receiving terminal determining a sequence number range of a storage window and using a minimum sequence number of the storage window as a modulus base for the modulus arithmetic when the out of sequence packet delivery function is configured; and
   wherein determining the sequence number range of the storage window comprises determining the sequence number range of the storage window according to a window size of the storage window and a state variable corresponding to a maximum sequence number of the sequence numbers that have been received under the out of sequence packet delivery function.

8. The method of claim 7, wherein the minimum sequence number of the storage window is derived from the state variable subtracting the window size of the storage window plus a predetermined value.

9. The method of claim 8, wherein the predetermined value is 1.

10. The method of claim 7, wherein the out of sequence packet delivery function is an out of sequence service data unit delivery function, known as out of sequence SDU delivery function.

11. A communications device of a wireless communications system for accurately comparing a state variable or a sequence number corresponding to a packet with modulus arithmetic to avoid comparison errors, the communications device operating in an unacknowledged mode and supporting an out of sequence packet delivery function, the communications device comprising:
   a control circuit for realizing functions of the communications device;
   a central processing unit coupled to the control circuit for executing a program code to operate the control circuit;
   a memory coupled to the central processing unit for storing the program code; and
   a reception buffer installed in the memory, for storing packets received by the communications device;

wherein the program code comprises:
    determining a sequence number range of a storage window and using a minimum sequence number of the storage window as a modulus base for the modulus arithmetic when the out of sequence packet delivery function is configured; and
    wherein determining the sequence number range of the storage window comprises determining the sequence number range of the storage window according to a window size of the storage window and a state variable corresponding to a maximum sequence number of the sequence numbers that have been received under the out of sequence packet delivery function.

12. The communications device of claim 11, wherein the minimum sequence number of the storage window is derived from the state variable subtracting the window size of the storage window plus a predetermined value.

13. The communications device of claim 12, wherein the predetermined value is 1.

14. The communications device of claim 11, wherein the out of sequence packet delivery function is an out of sequence service data unit delivery function, known as out of sequence SDU delivery function.

15. A method of comparing a state variable or a sequence number corresponding to a packet with modulus arithmetic for a receiving terminal of a wireless communications system, the receiving terminal operating in an unacknowledged mode and supporting an out of sequence packet delivery function and a duplicate avoidance and reordering function, hereinafter called DAR function, the method comprising:
    providing a reception buffer for storing packets received by the receiving terminal; and
    the receiving terminal using a sequence number of the latest packet received by the reception buffer plus a predetermined value as a modulus base for the modulus arithmetic when neither the out of sequence packet delivery function nor the DAR function is configured.

16. The method of claim 15, wherein the predetermined value is 1.

17. The method of claim 15, wherein the out of sequence packet delivery function is an out of sequence service data unit delivery function, known as out of sequence SDU delivery function.

18. A communications device of a wireless communications system for accurately comparing a state variable or a sequence number corresponding to a packet with modulus arithmetic to avoid comparison errors, the communications device operating in an unacknowledged mode and supporting an out of sequence packet delivery function and a duplicate avoidance and reordering function, hereinafter called DAR function, the communications device comprising:
    a control circuit for realizing functions of the communications device;
    a central processing unit coupled to the control circuit for executing a program code to operate the control circuit;
    a memory coupled to the central processing unit for storing the program code; and
    a reception buffer installed in the memory, for storing packets received by the communications device;
    wherein the program code comprises:
        using a sequence number of the latest packet received by the reception buffer plus a predetermined value as a modulus base for the modulus arithmetic when neither the out of sequence packet delivery function nor the DAR function is configured.

19. The communications device of claim 18, wherein the predetermined value is 1.

20. The communications device of claim 18, wherein the out of sequence packet delivery function is an out of sequence service data unit delivery function, known as out of sequence SDU delivery function.

21. A method of comparing a state variable or a sequence number corresponding to a packet with modulus arithmetic for a receiving terminal of a wireless communications system, the receiving terminal operating in an unacknowledged mode and supporting an out of sequence packet delivery function and a duplicate avoidance and reordering function, hereinafter called DAR function, the method comprising:
    establishing a DAR entity when the DAR function is initiated; providing a reception buffer for storing packets received by the receiving terminal;
    the receiving terminal determining a sequence number range of a receiving window and using a minimum sequence number of the receiving window as a modulus base for the modulus arithmetic when the DAR function is configured;
    the receiving terminal providing the modulus base for the DAR entity and the reception buffer to use when the DAR function is configured;
    the receiving terminal determining a sequence number range of a storage window and using a minimum sequence number of the storage window as the modulus base when the out of sequence packet delivery function is configured; and
    the receiving terminal using a sequence number of the latest packet received by the reception buffer plus a first predetermined value as the modulus base when neither the out of sequence packet delivery function nor the DAR function is configured.

22. The method of claim 21, wherein determining the sequence number range of the receiving window comprises determining the sequence number range of the receiving window according to a window size of the receiving window and a state variable corresponding to a maximum sequence number of the sequence numbers that have been received by the DAR entity.

23. The method of claim 22, wherein the minimum sequence number of the receiving window is derived from the state variable subtracting the window size of the receiving window plus a second predetermined value.

24. The method of claim 23, wherein the second predetermined value is 1.

25. The method of claim 21, wherein determining the sequence number range of the storage window comprises determining the sequence number range of the storage window according to a window size of the storage window and a state variable corresponding to a maximum sequence number of the sequence numbers that have been received under the out of sequence packet delivery function.

26. The method of claim 25, wherein the minimum sequence number of the storage window is derived from the state variable subtracting the window size of the storage window plus a second predetermined value.

27. The method of claim 26, wherein the first predetermined value is 1.

28. The method of claim 21, wherein the first predetermined value is 1.

29. The method of claim 21, wherein the out of sequence packet delivery function is an out of sequence service data unit delivery function, known as out of sequence SDU delivery function.

30. A communications device of a wireless communications system for accurately comparing a state variable or a sequence number corresponding to a packet with modulus arithmetic to avoid comparison errors, the communications device operating in an unacknowledged mode and supporting an out of sequence packet delivery function and a duplicate avoidance and reordering function, hereinafter called DAR function, the communications device comprising:
- a control circuit for realizing functions of the communications device;
- a central processing unit coupled to the control circuit for executing a program code to operate the control circuit;
- a memory coupled to the central processing unit for storing the program code; and
- a reception buffer installed in the memory, for storing packets received by the communications device;
- wherein the program code comprises:
  - establishing a DAR entity when the DAR function is initiated;
  - determining a sequence number range of a receiving window and using a minimum sequence number of the receiving window as a modulus base for the modulus arithmetic when the DAR function is configured;
  - providing the modulus base for the DAR entity and the reception buffer to use when the DAR function is configured;
  - determining a sequence number range of a storage window and using a minimum sequence number of the storage window as the modulus base when the out of sequence packet delivery function is configured; and
  - using a sequence number of the latest packet received by the reception buffer plus a first predetermined value as the modulus base when neither the out of sequence packet delivery function nor the DAR function is configured.

31. The communications device of claim 30, wherein determining the sequence number range of the receiving window comprises determining the sequence number range of the receiving window according to a window size of the receiving window and a state variable corresponding to a maximum sequence number of the sequence numbers that have been received by the DAR entity.

32. The communications device of claim 31, wherein the minimum sequence number of the receiving window is derived from the state variable subtracting the window size of the receiving window plus a second predetermined value.

33. The communications device of claim 32, wherein the second predetermined value is 1.

34. The communications device of claim 30, wherein determining the sequence number range of the storage window comprises determining the sequence number range of the storage window according to a window size of the storage window and a state variable corresponding to a maximum sequence number of the sequence numbers that have been received under the out of sequence packet delivery function.

35. The communications device of claim 34, wherein the minimum sequence number of the storage window is derived from the state variable subtracting the window size of the storage window plus a second predetermined value.

36. The communications device of claim 35, wherein the second predetermined value is 1.

37. The communications device of claim 30, wherein the first predetermined value is 1.

38. The communications device of claim 30, wherein the out of sequence packet delivery function is an out of sequence service data unit delivery function, known as out of sequence SDU delivery function.

* * * * *